(12) United States Patent
Parikh

(10) Patent No.: US 11,352,999 B2
(45) Date of Patent: Jun. 7, 2022

(54) SEPARATION ASSEMBLY WITH A TWO-PIECE IMPULSE TURBINE

(71) Applicant: Cummins Filtration IP, Inc., Columbus, IN (US)

(72) Inventor: Chirag D. Parikh, Madison, WI (US)

(73) Assignee: CUMMINS FILTRATION IP, INC, Columbus, IN (US)

( * ) Notice: Subject to any disclaimer, the term of this patent is extended or adjusted under 35 U.S.C. 154(b) by 0 days.

(21) Appl. No.: 17/044,371

(22) PCT Filed: Apr. 16, 2019

(86) PCT No.: PCT/US2019/027615
§ 371 (c)(1),
(2) Date: Oct. 1, 2020

(87) PCT Pub. No.: WO2019/204265
PCT Pub. Date: Oct. 24, 2019

(65) Prior Publication Data
US 2021/0102522 A1 Apr. 8, 2021

Related U.S. Application Data

(60) Provisional application No. 62/658,961, filed on Apr. 17, 2018.

(51) Int. Cl.
*F03B 1/02* (2006.01)
*F03B 1/04* (2006.01)
(Continued)

(52) U.S. Cl.
CPC ............... *F03B 1/02* (2013.01); *F03B 1/04* (2013.01); *F03B 11/02* (2013.01); *B04B 5/005* (2013.01);
(Continued)

(58) Field of Classification Search
CPC .... F03B 1/02; F03B 1/04; F03B 11/02; B04B 9/06; B04B 5/005; F05B 2240/121;
(Continued)

(56) References Cited

U.S. PATENT DOCUMENTS 391,523 A * 10/1888 Englebright ............ F03B 1/04
416/197 R
417,865 A * 12/1889 Green .................... F03B 15/20
416/197 R
(Continued)

FOREIGN PATENT DOCUMENTS

CN 101012838 8/2007
CN 201025219 2/2008
(Continued)

OTHER PUBLICATIONS

First Office Action issued for Chinese Patent Application No. 201880006007.0, dated Feb. 26, 2021, 9 pages.
(Continued)

*Primary Examiner* — Courtney D Heinle
*Assistant Examiner* — Ryan C Clark
(74) *Attorney, Agent, or Firm* — Foley & Lardner LLP

(57) ABSTRACT

A separation assembly comprises a housing, a jet that expels a fluid within the housing, and a turbine assembly positioned within the housing and positioned so as to be contacted by the fluid expelled from the jet. The fluid causes the turbine assembly to rotate about a center rotational axis within the housing. The turbine assembly comprises a first turbine portion and a second turbine portion that are separately formed from each other and attachable together. The first turbine portion comprises a plurality of first vanes and the second turbine portion comprises a plurality of second vanes.

32 Claims, 9 Drawing Sheets

(51) Int. Cl.
*F03B 11/02* (2006.01)
*B04B 5/00* (2006.01)
*B04B 9/06* (2006.01)

(52) U.S. Cl.
CPC ........... *B04B 9/06* (2013.01); *F05B 2240/121* (2013.01); *F05B 2240/123* (2013.01); *F05B 2240/14* (2013.01); *F05B 2240/241* (2013.01); *F05B 2260/201* (2013.01); *F05B 2260/301* (2013.01)

(58) Field of Classification Search
CPC ............ F05B 2240/123; F05B 2240/14; F05B 2240/241; F05B 2260/201; F05B 2260/301
See application file for complete search history.

(56) References Cited

U.S. PATENT DOCUMENTS

| | | | |
|---|---|---|---|
| 807,975 A * | 12/1905 | Stumpf | F04D 23/008 |
| | | | 415/57.2 |
| 1,681,705 A | 8/1928 | Moody | |
| 2,390,506 A | 12/1945 | Buchi | |
| 2,577,179 A | 12/1951 | Buchi | |
| 2,607,438 A | 8/1952 | Dailey | |
| 2,663,541 A | 12/1953 | Geen | |
| 3,041,039 A | 6/1962 | Ambroz | |
| 4,279,624 A | 7/1981 | Wilson | |
| 4,634,344 A | 1/1987 | Zagar et al. | |
| 5,611,668 A * | 3/1997 | Yapp | F04D 29/023 |
| | | | 416/189 |
| 6,071,300 A | 1/2000 | Brenneman et al. | |
| 6,019,717 A | 2/2000 | Herman | |
| 6,213,929 B1 * | 4/2001 | May | B04B 5/005 |
| | | | 494/24 |
| 6,508,628 B2 * | 1/2003 | Amr | F04D 29/023 |
| | | | 416/145 |
| 6,572,336 B2 * | 6/2003 | Horng | F04D 29/023 |
| | | | 416/183 |
| 6,925,993 B1 | 8/2005 | Eliasson et al. | |
| 9,322,307 B2 | 4/2016 | Andersson Aginger | |
| 2002/0098083 A1 | 7/2002 | Blangetti et al. | |
| 2003/0185682 A1 * | 10/2003 | Lei | F04D 29/023 |
| | | | 416/183 |
| 2004/0213675 A1 | 10/2004 | Blangetti et al. | |
| 2004/0219022 A1 | 11/2004 | Yang | |
| 2006/0003882 A1 * | 1/2006 | Smith | B01D 17/10 |
| | | | 494/49 |
| 2006/0039791 A1 | 2/2006 | Kim | |
| 2006/0093485 A1 | 5/2006 | Horng et al. | |
| 2009/0175729 A1 * | 7/2009 | Sun | F04D 29/325 |
| | | | 416/220 R |
| 2011/0180051 A1 | 7/2011 | Schwandt et al. | |
| 2013/0032646 A1 | 2/2013 | Dhiman et al. | |
| 2013/0056407 A1 | 3/2013 | Parikh et al. | |
| 2013/0094939 A1 | 4/2013 | Farb et al. | |
| 2013/0327010 A1 | 12/2013 | Muller et al. | |
| 2014/0147631 A1 | 5/2014 | Yang et al. | |
| 2015/0003996 A1 | 1/2015 | Krishna et al. | |
| 2015/0037134 A1 | 2/2015 | Isaev | |
| 2015/0203687 A1 | 7/2015 | Pardon et al. | |
| 2015/0246477 A1 | 9/2015 | Bormashenko et al. | |
| 2016/0169226 A1 | 6/2016 | Jenkins et al. | |

FOREIGN PATENT DOCUMENTS

| | | |
|---|---|---|
| CN | 103879084 | 6/2014 |
| EP | 2 638 944 A1 | 9/2013 |
| GB | 0 468 557 A | 7/1937 |
| GB | 0 938 967 A | 10/1963 |
| GB | 2 058 941 A | 4/1981 |
| GB | 2 455 816 | 6/2009 |
| WO | WO-2007/110059 | 10/2007 |
| WO | WO-2009/050462 A2 | 4/2009 |
| WO | WO-2016/200928 A1 | 12/2016 |

OTHER PUBLICATIONS

International Search Report & Written Opinion for PCT/US2017/064268 dated Feb. 12, 2018, 8 pages.
International Search Report & Written Opinion for PCT/US2018/012762 dated Mar. 26, 2018, 8 pages.
International Search Report & Written Opinion for PCT/US2019/016406, dated Apr. 22, 2019, 10 pages.
International Search Report & Written Opinion for PCT/US2019/027615 dated Jun. 25, 2019, 10 pages.
Non-Final Office Action issued for U.S. Appl. No. 16/474,742, dated Jul. 7, 2020.
Office Action issued for Chinese Patent Application No. CN 2019800167481, dated Sep. 23, 2021, 15 pages.
Shuming Xing, Melted Metal Die Forging, National Defense Industry Press, Sep. 2011, pp. 221-223.

* cited by examiner ued States Patent

US 11,352,999 B2

SEPARATION ASSEMBLY WITH A TWO-PIECE IMPULSE TURBINE

CROSS REFERENCE TO RELATED APPLICATION

This application is a National Stage of PCT Application No. PCT/US2019/027615, filed Apr. 16, 2019, which claims priority to and the benefit of U.S. Provisional Patent Application No. 62/658,961, filed on Apr. 17, 2018. The contents of these applications are hereby incorporated by reference in their entirety.

FIELD

The present invention relates generally to impulse turbines.

BACKGROUND

An impulse turbine assembly is a rotary system where the flow of fluid from a jet rotates a turbine, thereby converting hydraulic energy from the flow of fluid into rotational energy and converting hydraulic power (where hydraulic power is equal to the pressure times the flow) to mechanical power (where mechanical power is equal to the torque times the speed). Accordingly, impulse turbine assemblies can be used to power various devices, such as rotating filtration or separation devices. For example, impulse turbine assemblies can be used to power centrifuges (e.g., liquid-particle separators) or air-oil separators (e.g., crankcase ventilation devices). There are various types of impulse turbine assemblies such as Turgo-style or Pelton-style turbine assemblies (and various modifications for each style).

In a hydraulically-driven crankcase ventilation breather system, a filter element is spun with a turbine and a pressurized jet. Generally, the higher the turbine power conversion efficiency, the higher the rotational speed of the filter element, and higher rotational speed of the filter element results in greater filter efficiency.

FIGS. 1A-1C show an example of a single-piece, straight pull, Turgo-style turbine 130 that includes vanes 132 extending from a center hub 159 which provides poor tooling shut-off conditions for molding due to a relatively small space between the vanes 132. In the single-piece turbine 130 shown in FIGS. 1A-1C, a sufficiently large space is required between each of the vanes 132 about the center hub 159 of the single-piece turbine 130 in order to achieve a sufficiently robust shut-off condition for tooling and creating the single-piece turbine 130, in particular when the single-piece turbine 130 is casted or injected molded. If the space between each of the vanes 132 is not large enough, a robust tool shut-off condition may not be achieved, which may accelerate tool wear. However, this spacing between the vanes 132 limits the number of vanes 132 that can be included within the single-piece turbine 130. For example, in order to increase the spacing between vanes 132 and ensure a sufficient amount of space between the vanes 132, the number of vanes 132 within the single-piece turbine 130 is reduced. However, reducing the number of vanes 132 also lowers the power conversion efficiency of the single-piece turbine 130, which in turn reduces rotational speed of the filter element and thus also reduces the filter efficiency.

SUMMARY

Various embodiments provide for a separation assembly comprises a housing, a jet that expels a fluid within the housing, and a turbine assembly positioned within the housing and positioned so as to be contacted by the fluid expelled from the jet. The fluid causes the turbine assembly to rotate about a center rotational axis within the housing. The turbine assembly comprises a first turbine portion and a second turbine portion that are separately formed from each other and attachable together. The first turbine portion comprises a plurality of first vanes and the second turbine portion comprises a plurality of second vanes.

Various other embodiments provide for a turbine assembly for use in a separation assembly. The turbine assembly is sized for positioning within a housing of the separation assembly and positionable so as to be contacted by fluid expelled from a jet of the separation assembly, thereby causing the turbine assembly to rotate about a center rotational axis within the housing. The turbine assembly comprises a first turbine portion comprising a plurality of first vanes and a second turbine portion comprising a plurality of second vanes. The first turbine portion and the second turbine portion are separately formed from each other and attachable together.

Various other embodiments provide for a method of assembling a separation assembly. The separation assembly comprises a housing, a jet that expels a fluid within the housing, and a turbine assembly that comprises a first turbine portion and a second turbine portion. The first turbine portion comprising a plurality of first vanes and the second turbine portion comprising a plurality of second vanes. The method comprises separately forming the first turbine portion and the second turbine portion of the turbine assembly, attaching the first turbine portion and the second turbine portion together to form the turbine assembly, and positioning the turbine assembly within the housing so as to be contacted by the fluid expelled from the jet. The fluid causes the turbine assembly to rotate about a center rotational axis within the housing.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a separation assembly with a turbine assembly that is hydraulically driven. Due to various modifications compared to single-piece turbines, the turbine assembly is constructed as two pieces and with a Turgo-style. Accordingly, as described further herein, the turbine assembly comprises a first turbine portion and a second turbine portion, each of which comprise exactly half of the total number of vanes within the turbine assembly. This configuration enables the vanes on each of the first turbine portion and the second turbine portion to be spaced further apart from each other (prior to assembly of the turbine assembly 30), thereby providing more space between the vanes for improved tooling conditions compared to single-piece turbines. Once the first turbine portion and the second turbine portion are assembled together (as described further herein), the turbine assembly as a whole has a higher vane density compared to single-piece turbines, which improves the efficiency of the turbine assembly. Accordingly, high density materials may be used, such as materials used within plastic injection molding, metal injection molding, and die-casting enabling wear-resistant turbine designs.

Separation Assembly

Figure 1A:
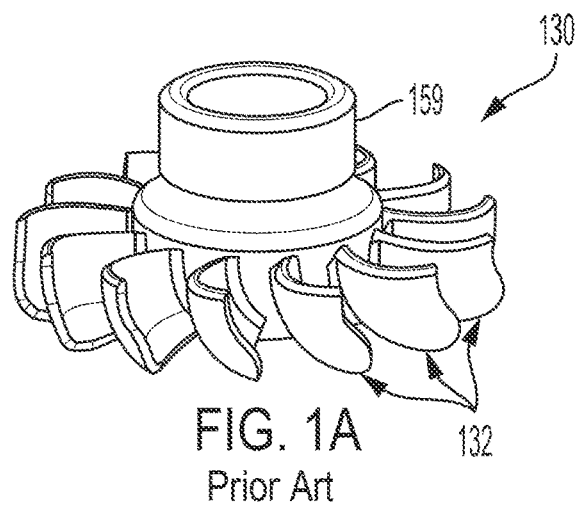
FIG. 1A is a perspective view of an exemplary single-piece, straight pull, Turgo-style turbine.
Figure 1B:
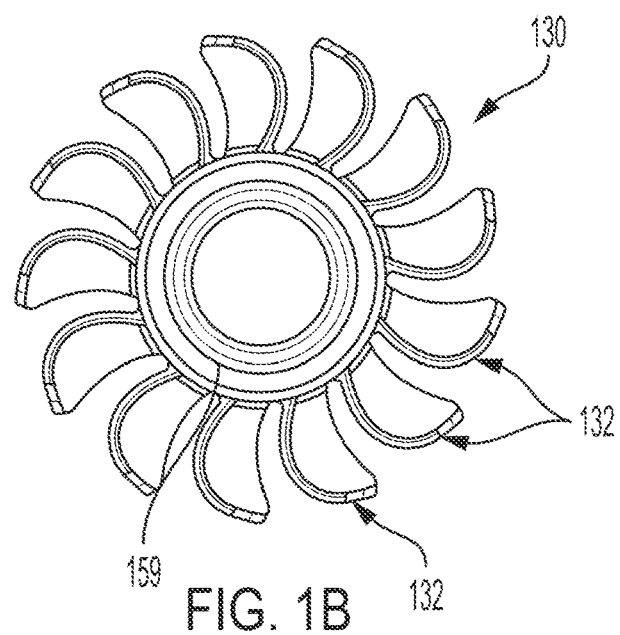
FIG. 1B is a top view of the turbine of FIG. 1A.
Figure 1C:
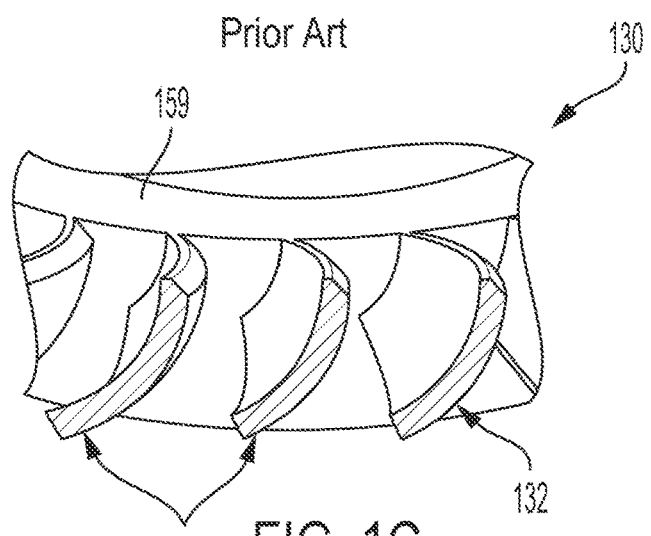
FIG. 1C is a cross-sectional view of the turbine of FIG. 1A.
Figure 2A:
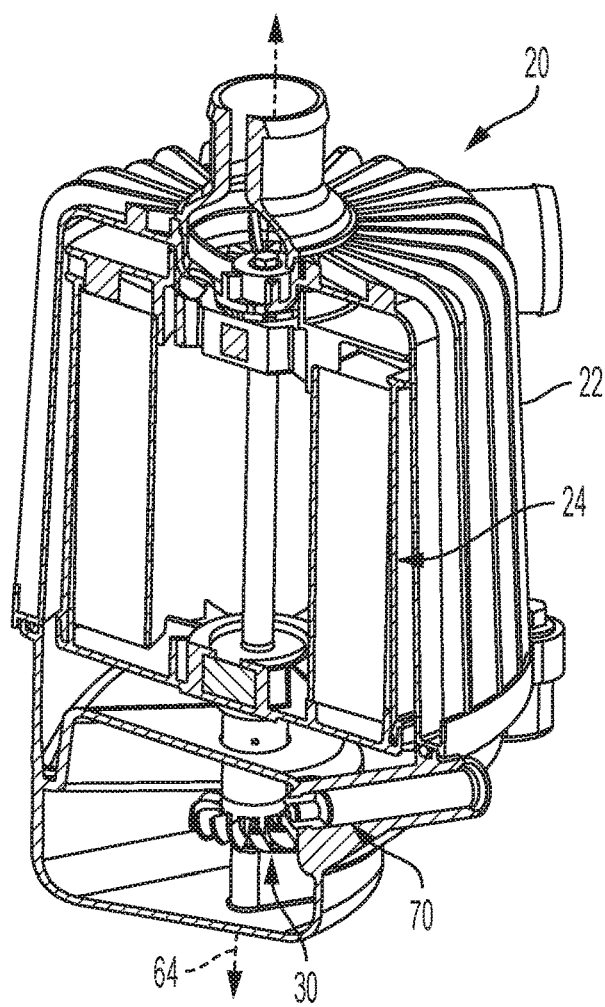
FIG. 2A is a cross-sectional view of a separation assembly according to one embodiment.
Figure 2B:
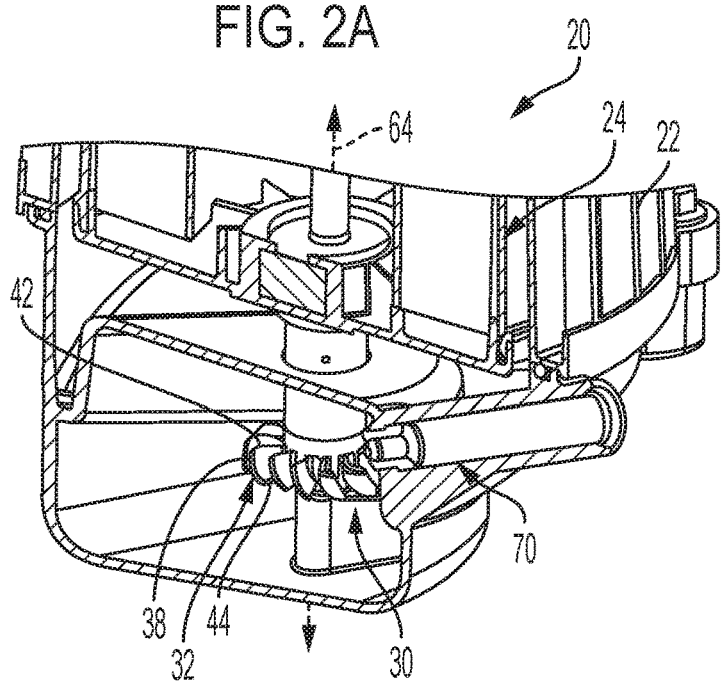
FIG. 2B is a cross-sectional view of a portion of the separation assembly of FIG. 2A.

As shown in FIGS. 2A-2B, the separation device or assembly 20 comprises a housing 22, an impulse turbine assembly 30, and a rotor portion 24 that the turbine assembly 30 is configured to rotate. The turbine assembly 30 and the rotor portion 24 are positioned and rotatable within the housing 22. The separation assembly 20 further comprises a tangential nozzle or jet 70 that is configured to expel fluid within the housing 22 toward and into the turbine assembly 30 in order to rotate the turbine assembly 30 within the housing 22 and allow the turbine assembly 30 to power the rest of the separation assembly 20.

The separation assembly 20 may utilize and include a variety of different separation technologies, including but not limited to plates, channels (e.g., axial flow channels), an axial flow filter element, and various cylindrical filter media. For example, according to one embodiment, the separation assembly 20 is a cone or disc stack separator. According to another embodiment, the separation assembly 20 is an involute plate/channel stack separator. According to yet another embodiment, the separation assembly 20 is an axial flow separator.

The separation assembly 20 may be a variety of different rotating filtration or separation devices, including but not limited to a lube-oil-driven product, a centrifuge (such as a rotating aerosol or particle separation device, a liquid-particle separator, an aerosol separator, a liquid centrifuge (with a lube bypass), etc.), an inertial separator, a lube-oil separator, and an air-oil separator (such as a rotating crankcase ventilation air-oil separator (that is, for example, media-based, axial-channel based, involute based, etc.), a crankcase blowby oil separator, or a rotating crankcase air-oil separator). The separation assembly 20 may be used as a lube-oil centrifuge as described, for example and according to one embodiment, in U.S. Pat. No. 6,071,300, the entire disclosure of which is incorporated herein by reference. The separation assembly 20 may be used for air filtration and/or for emissions and may be hydraulically driven. Further, the separation assembly 20 may be mounted to or used within an engine, such as a diesel engine that requires a hydraulically-driven rotating crankcase ventilation (HRCV) system.

The rotor portion 24 can comprise a variety of different rotatable portions within the separation assembly 20 (such as a filter element) and may comprise, for example, cone stack, spiral vane, axial flow, or media type filter element in order to filter a fluid and a rod to rotatably connect the turbine assembly 30 to the filter element. The rotor portion 24 is configured to be inexpensively rotated or driven by the turbine assembly 30.

In order to assemble the separation assembly 20, the first turbine portion 80 and the second turbine portion 90 are first separately formed from each other. Then, the first turbine portion 80 and the second turbine portion 90 are attached together to form the turbine assembly 30. The turbine assembly 30 is positioned within the housing 22 so as to be contacted by fluid expelled by the jet 70.

Jet

Figure 8A:
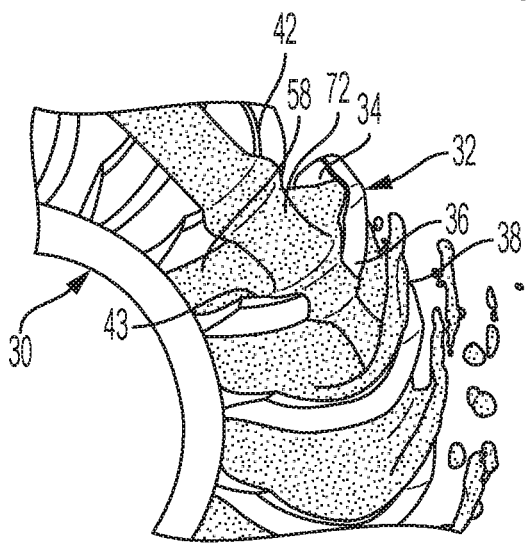
FIG. 8A is a top view of the turbine assembly of FIG. 3A under a computational fluid dynamics (CFD) simulation.
Figure 8B:
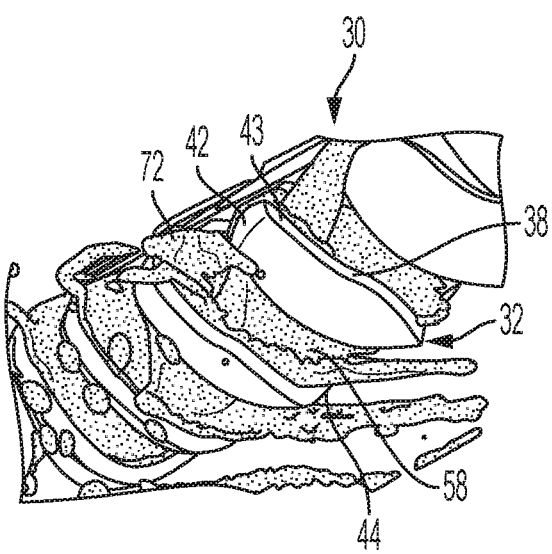
FIG. 8B is a side view of the turbine assembly of FIG. 3A under a CFD simulation.

As shown in FIGS. 2A-2B, the pressurized and impinging or impulse fluid drive jet 70 is positioned near the turbine assembly 30 in order to direct fluid to the turbine assembly 30. The jet 70 may be integrated within a portion of the housing 22. The pressurized jet 70 expels a pressurized fluid 72 (e.g., a drive liquid) (as shown in FIGS. 8A-8B) from an end or nozzle of the jet 70 toward the turbine assembly 30 to spin, rotate, or otherwise turn the turbine assembly 30. The nozzle of the jet 70 has a smaller diameter than the body of the jet 70. The pressure or flow of the fluid 72 causes the turbine assembly 30 to rotate, thus transferring the kinetic energy (as created by conversion from pressure, per Bernoulli) of the flowing fluid 72 to the turbine assembly 30, which rotates the turbine assembly 30.

Since the turbine assembly 30 is a Turgo-style turbine, the jet 70 is positioned above the turbine assembly 30 (e.g., above and along the top end 42 of the vanes 32) and angled downward (relative to a horizontal radial-tangential plane of the turbine assembly 30) toward the turbine assembly 30 with the end of the nozzle pointing (as shown in FIGS. 2A-2B and 10A-10B) such that the jet 70 can direct fluid 72 first toward the top end 42 of the vanes 32 of the turbine assembly 30. Accordingly, as shown in FIGS. 8A-8B, the fluid from the jet 70 first flows along the top end 42 of the vanes 32 and subsequently flows from the top end 42 of the vanes 32 toward other areas of the vane 32 (such as the bottom end 44 and/or the outer side edge 38 of the vanes 32). The particular angle of the jet 70 relative to the turbine assembly 30 may vary according to the desired configuration.

The fluid 72 may be, for example, a liquid. According to a more particular embodiment, the fluid 72 may be typical drive fluid such as oil (e.g., engine oil, lube oil, or hydraulic fluid). For example, the fluid 72 may be pressurized engine lube oil. As described further herein, the fluid 72 has a relatively high working-temperature viscosity compared to water.

Turbine Assembly

As shown in FIGS. 3A-4B and 9A-9B, the two-piece, hydraulic, impulse drive wheel or turbine assembly 30 is a rotatable component within the separation assembly 20 (as shown in FIGS. 2A-2B) that is driven by the fluid 72 (as shown in FIGS. 8A-8B) in order to rotate the rotor portion 24 within the separation assembly 20. More specifically, the turbine assembly 30 is positioned within (and sized to be positioned within) the housing 22 so as to be contacted, rotated, or hydraulically driven about the center rotational axis 64 (within the housing 22) by the fluid 72 expelled from the jet 70. The turbine assembly 30 thus rotates or drives the rotor portion 24 such that rotation of the rotor portion 24 is correlated to rotation of the turbine assembly 30. The force of the incoming fluid 72 from the jet 70 causes the turbine assembly 30 to rotate about the center rotational axis 64 within the housing 22 of the separation assembly 20 (as shown in FIGS. 2A-2B), thereby converting the hydraulic power of the fluid 72 into mechanical power.

The turbine assembly 30 is used to convert hydraulic power into mechanical power, where hydraulic power=pressure*flow and mechanical power=torque*speed. Accordingly, the turbine assembly 30 receives a flow of fluid 72 from the jet 70 at a high velocity. The fluid momentum flux of the fluid 72 is transferred to the turbine assembly 30 as an impulse force, which then rotates the turbine assembly 30 with some associated losses (e.g., losses associated with the conversion of power from hydraulic to rotational). Accordingly, the turbine assembly 30 imparts a "change in momentum" or "impulse" on the fluid, thereby converting the momentum of the fluid 72 into a force or torque, which rotates the turbine assembly 30 and thus rotates the rotor portion 24. The rotational speed of the turbine assembly 30 may vary according to the desired configuration.

The turbine assembly 30 has an impulse-bucket design that is Turgo-style. Turgo-style is characterized by the jet 70 being angled downward toward and onto the top entrance-face or the first axial end 52 of the turbine assembly 30 (which corresponds to the top end 42 of the vanes 32), thus aiming the fluid exiting the jet 70 to be directed to the top end 42 of the vanes 32 (and subsequently to flow to other areas of the vane 32). With a turbine assembly 30 that is Turgo-style, the jet 70 is at an angle (i.e., a slight axial-downward tilt-angle) relative to a horizontal radial-tangential plane of the turbine assembly 30 (where the horizontal radial-tangential plane is perpendicular to the axial center rotational axis 64 of the turbine assembly 30). For example, the jet 70 may expel the fluid 72 into the turbine assembly 30 at a finite approach angle (typically approximately 15-20°) from above or below. Comparatively, in a turbine that is Pelton-style in various prior art designs, the jet is a straight tangential jet and is substantially parallel to (rather than at an angle to) the horizontal radial-tangential plane of the turbine.

Turbine Assembly Configuration

The configuration of the turbine assembly 30, which may be a HRCV turbine, allows the turbine assembly 30 to have a high efficiency (compared to single-piece turbines 130) and be low cost, while enabling a rotational speed that approximately matches electrically-driven rotating crankcase ventilation (eRCV) rotational speeds. Accordingly, the entire separation assembly 20 may also be highly efficient, which decreases the cost compared to an eRCV motor.

Figure 3A:
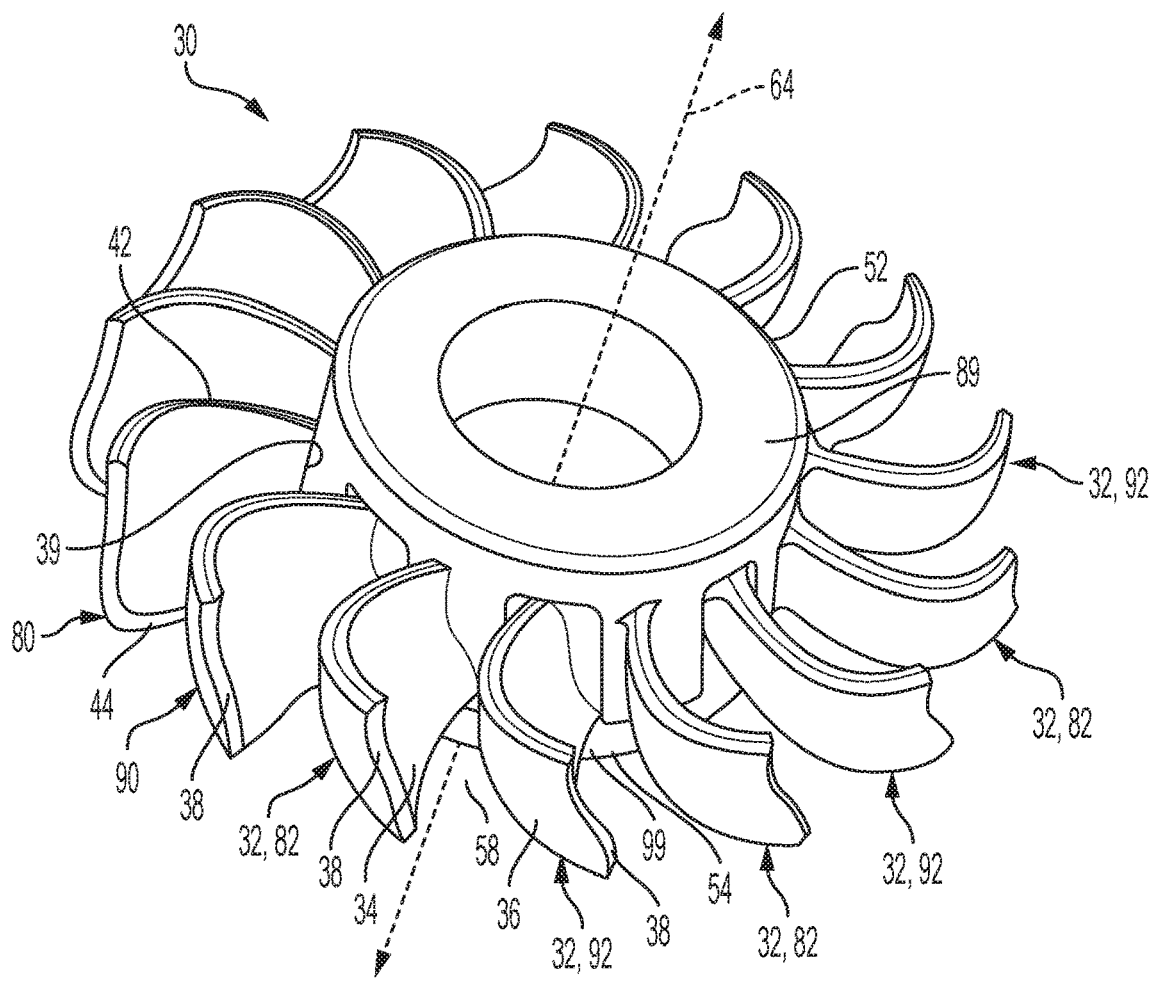
FIG. 3A is a perspective view of a turbine assembly of the separation assembly of FIG. 2A.

As shown in FIG. 3A, the overall shape of the turbine assembly 30 is substantially cylindrical. The turbine assembly 30 has an axial center rotational axis 64 extending through the center and along the axial length of the turbine assembly 30. The center rotational axis 64 extends in the axial direction, and the turbine assembly 30 rotates about the center rotational axis 64 (in particular within the separation assembly 20).

The turbine assembly 30 comprises a first axial end 52 and a second axial end 54. The first axial end 52 and the second axial end 54 of the turbine assembly 30 are opposite each other along the length of the center rotational axis 64. The turbine assembly 30 and the jet 70 are oriented and positioned relative to each other such that the jet 70 directs at least a portion of the fluid 72 to enter into the turbine assembly 30 along the top end 42 of the vanes 32, which is relatively closer to the first axial end 52 of the turbine assembly 30 than the second axial end 54 (and the bottom end 44 of the vanes 32 is closer to the second axial end 54 of the turbine assembly 30 than the first axial end 52). Neither the first axial end 52 nor the second axial end 54 are closed off such that fluid can flow between and through the first axial end 52 and the second axial end 54 by flowing above, between, and subsequently below the vanes 32.

As described further herein, the turbine assembly 30 is formed from two distinct pieces of material that are separately formed from each other and attachable to each other. Accordingly, the turbine assembly 30 comprises a first turbine portion 80 and a second turbine portion 90, as described further herein, that can be assembled or are attachable together to form or create the turbine assembly 30. Additionally, the turbine assembly 30 further comprises a plurality of vanes 32 (on each of the first turbine portion 80 and the second turbine portion 90) that capture at least a portion of the flow of fluid 72 from the jet 70.

Vanes

The turbine assembly 30 comprises multiple or a plurality of buckets, blades, or vanes 32 (referred to generally herein as "vanes") that are positioned and shaped to capture the flow of fluid 72 from the jet 70 and thus allow the turbine assembly 30 to be rotated accordingly. Accordingly, the jet 70 directs the fluid 72 toward the vanes 32 in order to rotate the entire turbine assembly 30.

Each of the vanes 32 comprise and extend vertically or axially between a tip or top end 42 and a bottom end 44 (of each of the vanes 32). As shown in FIG. 3A, each of the vanes 32 extend axially (e.g., along the direction of the center rotational axis 64) from an area near the first axial end 52 of the turbine assembly 30 to an area near the second axial end 54 of the turbine assembly 30. The vertical leading edge or top end 42 of the vane 32 refers to the end of the vane 32 closest to the first axial end 52 of the turbine assembly 30 and is the edge of the vane 32 that first intercepts the fluid 72 from the jet 70 (before other areas of the vane 32). The bottom end 44 of the vane 32 refers to the end of the vane 32 closest to the second axial end 54 of the turbine assembly 30 and is opposite to the top end 42. As described further herein in regard to the undercut features, a portion of each respective vane 32 bows or curves relative to the axial direction (that is parallel to the center rotational axis 64) between the top end 42 and the bottom end 44 of the vane 32.

Each of the vanes 32 also extends radially relative to the center rotational axis 64 from outside surface of the one of the first hub 89 or the second hub 99 (as described further herein) of the turbine assembly 30 and curves relative to the radial direction about a portion of the circumference (e.g., about the center rotational axis 64) of the turbine assembly 30 between a radial inner side edge 39 and a radial outer side edge 38 of the vane 32 (where the radial inner side edge 39 extends directly from the first hub 89 or the second hub 99). The vanes 32 are positioned and spaced out along the entire circumference of the turbine assembly 30.

As shown in FIG. 3A, the vanes 32 define axially-extending, longitudinal, u-shaped (with respect to the radial direction) gaps, spaces, or channels 58 between each of the vanes 32 in order to allow the fluid 72 to flow through the channels 58 between the vanes 32 and to direct the fluid 72 axially and radially along the turbine assembly 30. The channels 58 extend axially from the first axial end 52 to the second axial end 54 of the turbine assembly 30. Each of the channels 58 is positioned and extends radially between two adjacent vanes 32, in particular between a first vane 82 of the first turbine portion 80 and a second vane 92 of the second turbine portion 90 when the turbine assembly 30 is assembled and between two first vanes 82 and two second vanes 92 prior to assembly of the turbine assembly 30 (as described further herein).

The vanes 32 each comprise a pressure face or curved impingement surface 34 on a first front side of the vane 32 and a back-swept surface, back-face, suction face, or backside 36 on a second side of the vane 32. The impingement surface 34 (and the front side) on the first side of the vane 32 is opposite the backside 36 on the second side of the vane 32. The fluid 72 from the jet 70 is directed directly to or toward the impingement surface 34 (as shown in FIG. 8A, for example). The impingement surface 34 curves inwardly axially and radially along a portion of the length of the vane 32 (i.e., inwardly along a middle portion of the length of the vane 32), while the backside 36 curves outwardly axially and radially along a similar, substantially parallel curvature (as the curvature of the impingement surface 34) along a portion of the length of the vane 32 (i.e., outwardly along a middle portion of the length of the vane 32). The impingement surface 34 and the backside 36 of each of the vanes 32 connect to (and curve into) the outer surface of one of the first hub 89 or the second hub 99 of the turbine assembly 30.

Figure 3B:
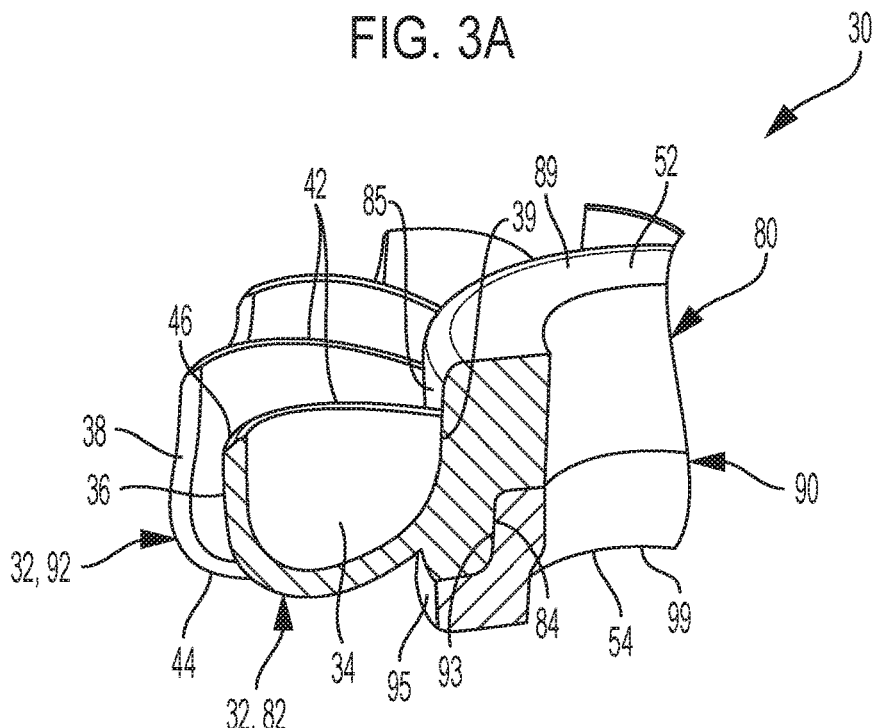
FIG. 3B is a cross-sectional view of a portion of the turbine assembly of FIG. 3A.

As shown in FIG. 3B, each of the vanes 32 comprises and extends radially between a radial inner side edge 39 and a radial outer side edge 38 (of each of the vanes 32). The impingement surface 34 and the backside 36 converge at the outer side edge 38 of the vane 32 along one side of the vane 32 and at the inner side edge 39 of the vane 32 along the other side of the vane 32 (at either the first hub 89 or the second hub 99) (the impingement surface 34 and the backside 36 also converge at the top end 42 and at the bottom end 44 of the vane 32). The outer side edge 38 and the inner side edge 39 of the vane 32 each extend axially from the top end 42 to the bottom end 44 of the vane 32, in an area between the first axial end 52 and the second axial end 54 of the turbine assembly 30.

Before the turbine assembly 30 is assembled, the space between adjacent vanes 32 (i.e., between two first vanes 82 or two second vanes 92) is larger than the space between adjacent vanes 32 (i.e., between a first vane 82 and a second vane 92) since the first turbine portion 80 and the second turbine portion 90 are not assembled together yet. Due to the increased space between the vanes 32 prior to assembly of the turbine assembly 30 as a result of the first and second turbine portions 80 and 90 (as described further herein), the number of vanes 32 within the turbine assembly 30 may vary according to the desired configuration. In certain applications, for the appropriate turbine pitch for crankcase ventilation applications, approximately 14 total vanes 32 within the turbine assembly 30 are desired. However, depending on the desired configuration, the turbine assembly 30 may either maintain the number of total vanes 32 or have a larger number of total vanes 32 compared to single-piece turbines 130 (assuming the same pitch diameter). For example, the turbine assembly 30 may have 14 total vanes 32 (i.e., 7 vanes on each of the first and second turbine portions 80 and 90), while the single-piece turbines 130 may have 13 total vanes 132. Meanwhile, the turbine assembly 30 has improved tooling conditions by providing more space within the respective channels 58 between the vanes 32 during manufacturing and prior to assembly of the turbine assembly 30.

First and Second Turbine Portions

As shown in FIGS. 3A-6B and 9A-10B, the turbine assembly 30 comprises two turbine portions: a first turbine portion 80 and a second turbine portion 90. The first turbine portion and the second turbine portion 90 are separately and individually formed from each other and as one singular piece each. As shown in FIGS. 3A-3B, the first and second turbine portions 80 and 90 are configured to be assembled, attached, bonded, or otherwise coupled together to create the entire turbine assembly 30. Each of the first turbine portion 80 and the second turbine portion 90 comprise exactly half of the total number of vanes 32 within the turbine assembly 30. Accordingly, the vanes 32 include a set or plurality of first vanes 82 and a set or plurality of second vanes 92. The plurality of first vanes 82 is exactly half of the total number of vanes 30 within the turbine assembly 30, and the plurality of second vanes 92 is exactly the other half of the total number of vanes 32 within the turbine assembly 30. The first turbine portion 80 comprises the plurality of first vanes 82 and the second turbine portion 90 comprises the plurality of second vanes 92. When the first and second turbine portions 80 and 90 are attached together (as described further herein), the plurality of first vanes 82 and the plurality of second vanes 92 are alternatively arranged with each other about the circumference of the turbine assembly 30. Aside from being positioned on either the first turbine portion 80 or the second turbine portion 90, the first vanes 82 and the second vanes 92 may be substantially identical in size and shape.

Figure 5:
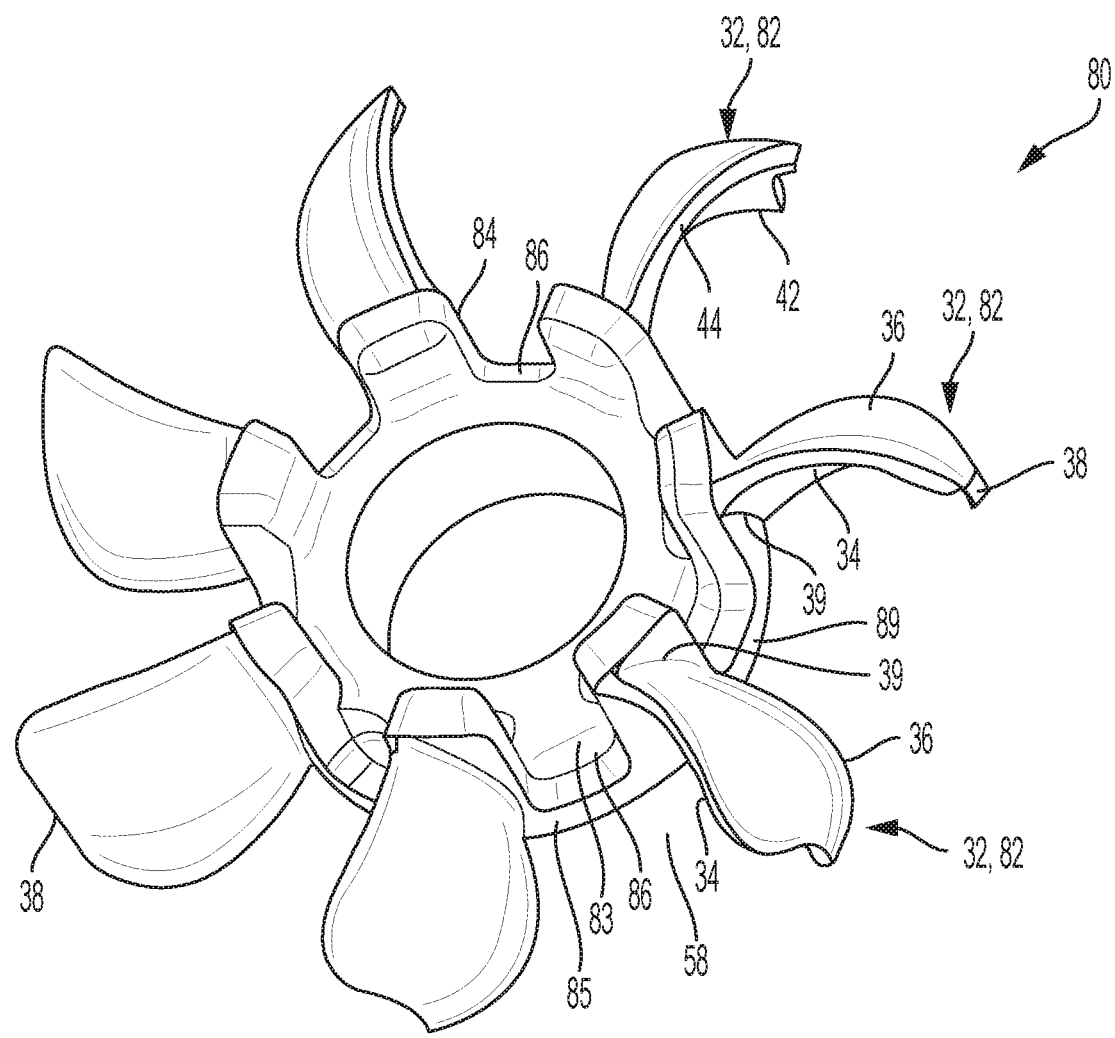
FIG. 5 is a perspective view of a first turbine portion of the turbine assembly of FIG. 3A.
Figure 6A:
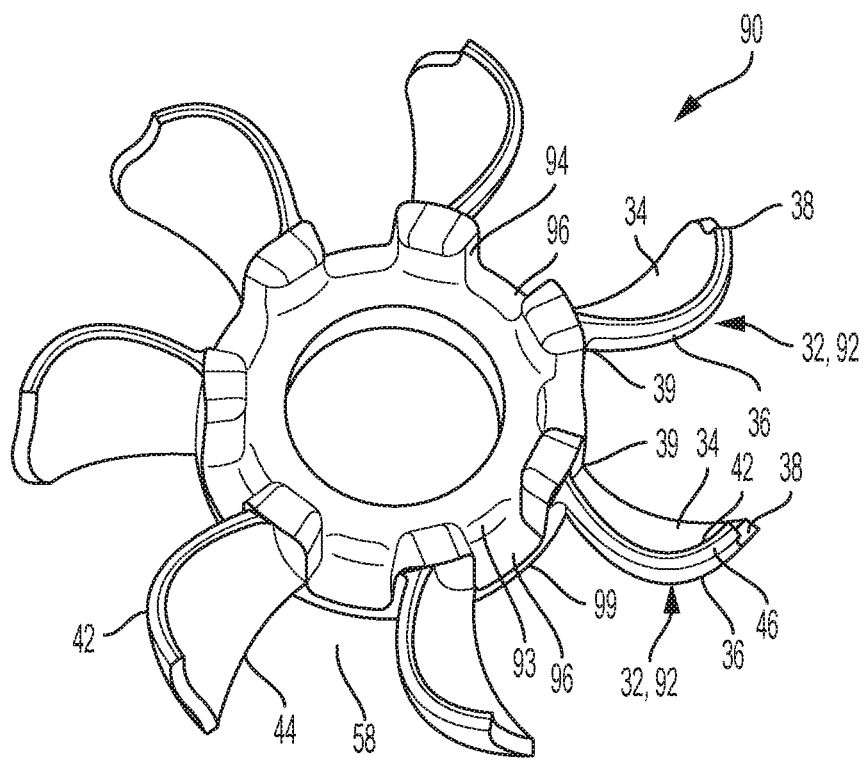
FIG. 6A is a perspective view of a second turbine portion of the turbine assembly of FIG. 3A.
Figure 6B:
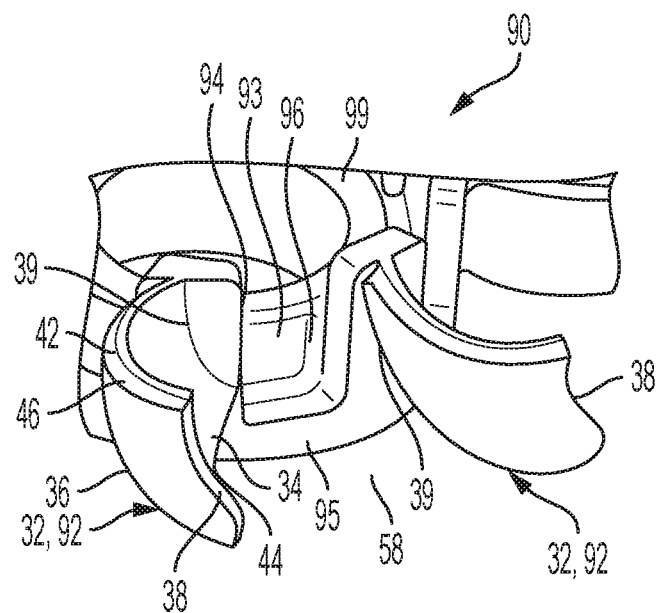
FIG. 6B is a perspective view of a portion of the second turbine portion of the turbine assembly of FIG. 3A.

By providing two turbine portions (i.e., the first and second turbine portions 80 and 90) that create the turbine assembly 30, a larger spacing within the respective channels 58 between each of the adjacent vanes 32 (i.e., between the first vanes 82 or between the second vanes 92) is provided during manufacturing (i.e., prior to assembly of the turbine assembly 30) while still maintaining or increasing the number or density of vanes 32 within the turbine assembly 30 (once the turbine assembly 30 has been assembled). For example, as shown in FIGS. 5 and 6A, there is a relatively larger channel 58 between adjacent first vanes 82 in the first turbine portion 80 alone and between adjacent second vanes 92 in the second turbine portion 90 alone compared to both vanes 132 in various single-piece turbines 130 and compared to the size of the channels 58 once the turbine assembly 30 is assembled (as shown in FIG. 3A). Accordingly, the distance between individual vanes 32 of the plurality of first vanes 82 and the distance between individual vanes 32 of the plurality of second vanes 92 is greater than the distance between each of the plurality of first vanes 82 and the plurality of second vanes 92 once the first turbine portion 80 and the second turbine portion 90 are attached together.

As the distance between adjacent vanes 32 is larger prior to assembly (i.e., the channel 58 between the vanes 32 is larger prior to assembly of the turbine assembly 30), tooling of the turbine assembly 30 is simplified and robust shut-off conditions for tooling are provided. Accordingly, the turbine assembly 30 may be produced by being molded or cast by inexpensive manufacturing processes, including, but not limited to, plastic injection molding, metal injection molding, die casting, or investment casting.

Once the first and second turbine portions 80 and 90 are assembled together, the distance between adjacent vanes 32 (i.e., the size of the channel 58 between each of the vanes 32) is decreased (compared to before assembly and compared to single-piece turbines 130), which increases the performance of the turbine assembly 30 and decreases the amount of jet-spill (i.e., fluid 72 that deflects outward immediately after the fluid 72 hits the vanes 32) compared to single-piece turbines 130. Accordingly, the amount of momentum from the fluid 72 that is captured and converted into rotation of the turbine assembly 30 is increased, which increases the hydraulic efficiency of the turbine assembly 30. Since the turbine assembly 30 can be both inexpensively manufactured and rotated a high efficiency, the separation assembly 20 can be inexpensively driven and powered at a relatively high rotational speed.

The first turbine portion 80 and the second turbine portion 90 each define and comprise a first center hub 89 and a second center hub 99, respectively. The first and second center hubs 89 and 99 extend along at least a portion of the length of the turbine assembly 30 (i.e., substantially parallel to the center rotational axis 64) and around the center of the turbine assembly 30 (i.e., surrounding the center rotational axis 64). At least a portion of the first and second center hubs 89 and 99 may be hollow to provide and define an area within the turbine assembly 30 to attach with another feature within the separation assembly 20, such as to directly attach to the rotor portion 24, thereby allowing the turbine assembly 30 to cause the rotor portion 24 to rotate. The vanes 32, in particular the first plurality of vanes 82 and the second plurality of vanes 92, extend from respective outer surfaces of each of the first center hub 89 and the second center hub 99, respectively.

Figure 4A:
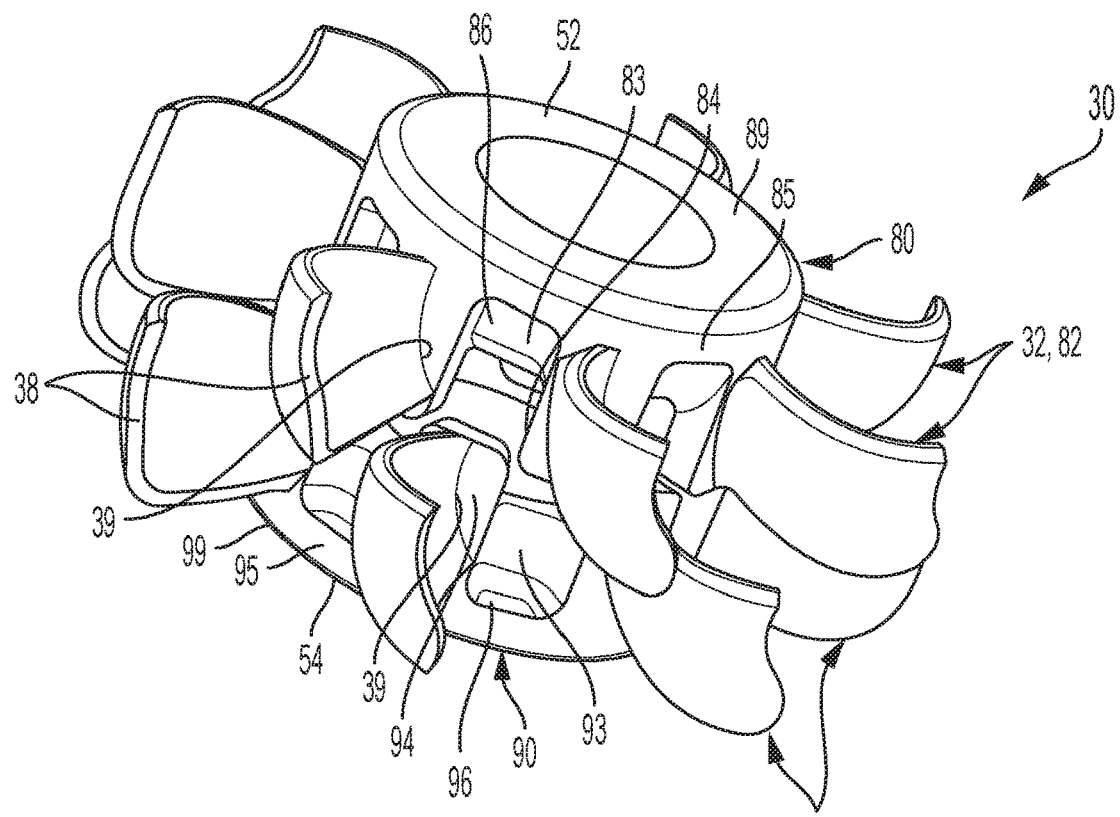
FIG. 4A is an exploded view of the turbine assembly of FIG. 3A.
Figure 4B:
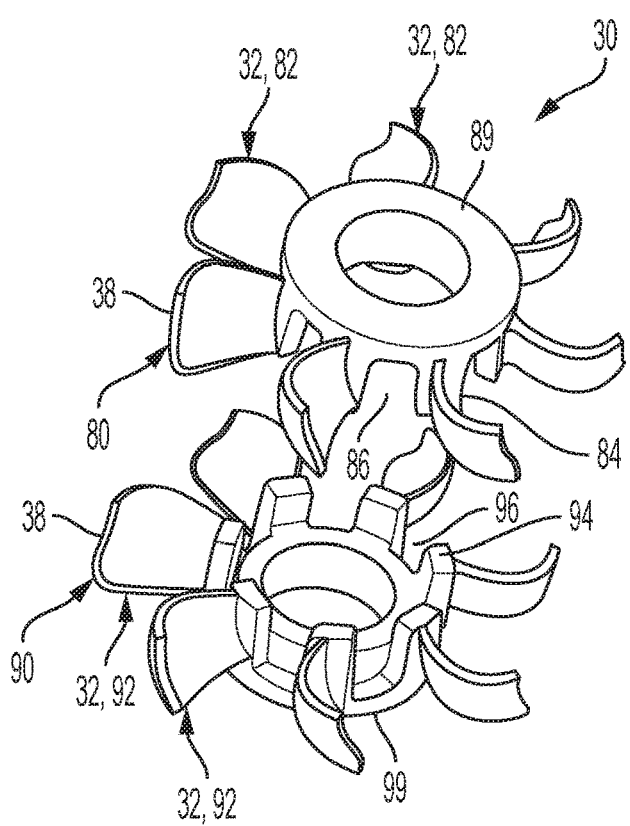
FIG. 4B is an exploded view of the turbine assembly of FIG. 3A.

In order to attach together, the first hub 89 of the first turbine portion 80 comprises a plurality of first ribs 84 and defines a plurality of first recesses 86 between each of the plurality of first ribs 84, and the second hub 99 of the second turbine portion 90 comprises a plurality of second ribs 94 and defines a plurality of second recesses 96 between each of the plurality of second ribs 94, as shown in FIGS. 4A-4B. The plurality of first ribs 84 and the plurality of first recesses 86 of the first turbine portion 80 are together complementary to the plurality of second ribs 94 and the plurality of second recesses 96 of the second turbine portion 90. Accordingly, each of the plurality of first ribs 84 fits securely within a respective one of the plurality of second recesses 96 and between two of the plurality of second ribs 94 of the second turbine portion 90 after assembly of the turbine assembly 30. At the same time, each of the plurality of second ribs 94 fits securely within a respective one of the plurality of first recesses 86 and between two of the plurality of first ribs 84 of the first turbine portion 80 after assembly of the turbine assembly 30. The first ribs 84 and the first recesses 86 together with the second ribs 94 and the second recesses 96 allow the first and second turbine portions 80 and 90 to nest and interlock together after assembly. Additionally, the first ribs 84, the first recesses 86, the second ribs 94, and the second recesses 96 also circumferentially and axially align the first and second turbine portions 80 and 90 together and determine the distance between each of the first vanes 82 and the second vanes 92. The first ribs 84, the first recesses 86, the second ribs 94, and the second recesses 96 are shaped and configured such that the set of first vanes 82 and the set of second vanes 92 also are all circumferentially and axially aligned with each other once the first turbine portion 80 and the second turbine portion 90 are attached to each other.

At least a portion of each of the first vanes 82 extends along the length of and extends directly from a respective one of the first ribs 84, and at least a portion of each of the second vanes 92 extends along the length of and extends directly from a respective one of the second ribs 94. According to one embodiment, the entire length or height of the first vanes 82 (i.e., the entire inner side edge 39) extends along and extends directly from the first ribs 84 and/or the entire length or height of the second vanes 92 (i.e., the entire inner side edge 39) extends along and extends directly from the second ribs 94. Accordingly, the first ribs 84 support the first vanes 82 and the second ribs 94 support the second vanes 92, which increases or improves the structural support for each of the first and second vanes 82 and 92 and the structural integrity of the turbine assembly 30.

As shown in FIG. 4A, the first turbine portion 80 further comprises a plurality of first inner walls 83 (that are each positioned between two of the plurality of first ribs 84) and the second turbine portion 90 further comprises a plurality of second inner walls 93 (that are each positioned between two of the plurality of second ribs 94) to help further align the first and second turbine portions 80 and 90 together and to structurally support the turbine assembly 30 as a whole. The first and second inner walls 83 and 93 are recessed (and positioned) within the first and second recesses 86 and 96, respectively, and relative to the outer surface of the first and second hubs 89 and 99, respectively (as well as relative to the outermost radial surface of the first and second ribs 84 and 94, respectively). The first and second inner walls 83 and 93 may only extend along a portion of the height of each of the first and second recesses 86 and 96, respectively. However, it is understood that the first and second inner walls 83 and 93 may extend along the entire height of the first and second recesses 86 and 96, respectively.

The inner surfaces of the first and second ribs 84 and 94 are complementary (in shape, size, position, and number) to the outer surfaces of the second and first inner walls 93 and 83, respectively. Accordingly, when the turbine assembly 30 is assembled, the first ribs 84 are positioned within respective second recesses 96 and the inner surfaces of the first ribs 84 directly face or abut the respective outer surfaces of the second inner walls 93 (as shown in FIG. 3B). At the same time, the second ribs 94 are positioned within respective first recesses 86 and the inner surfaces of the second ribs 94 directly face or abut the respective outer surfaces of the first inner walls 83. The first and second inner walls 83 and 93 help align the first and second turbine portions 80 and 90 to each other, in particular along the radial and tangential directions.

As shown in FIG. 3B, a top or base portion 85 of the first turbine portion 80 is positioned axially between the top axial end of the first turbine portion 80 and the top end 42 of the first vanes 82 (i.e., closer to the first axial end 52 of the turbine assembly 30). A bottom or base portion 95 of the second turbine portion 90 is positioned axially between the bottom axial end of the second turbine portion 90 and the bottom end 44 of the second vanes 92 (i.e., closer to the second axial end 54 of the turbine assembly 30). When the turbine assembly 30 is assembled, the base portion 85 and the base portion 95 are closer to, and optionally positioned along, opposite ends of the turbine assembly 30.

The first ribs 84 extend from the base portion 85 in a direction away from the top axial end of the first turbine portion 80 (and away from the first axial end 52 of the turbine assembly 30). The second ribs 94 extend from the base portion 95 in a direction away from the bottom axial end of the second turbine portion 90 (and away from the second axial end 54 of the turbine assembly 30). However, the top ends 42 of the first vanes 82 of the first turbine portion 80 are closer to the base portion 85 (than the bottom ends 44 of the first vanes 82), whereas the top ends 42 of the second vanes 92 of the second turbine portion 90 are further from the base portion 95 (than the bottom ends 44 of the second vanes 92). When assembled or attached together, the first turbine portion 80 and the second turbine portion 90 are oriented relative to each other such that the first ribs 84 and the second ribs 94 extend toward each other and the base portions 85 and 95 are positioned along opposite axial ends of the entire turbine assembly 30.

In order to assemble the first and second turbine portions 80 and 90 together, the first turbine portion 80 is placed over the second turbine portion 90 (or vice versa) such that the first and second ribs 84 and 94 (with the first and second recesses 86 and 96, respectively) interlock with each other. The relative configurations of the first and second turbine portions 80 and 90 allows the first and second vanes 82 and 92 to alternate with each other about the circumference of the turbine assembly 30. Once assembled, the base portion 85 of the first turbine portion 80 is closer to the first axial end 52 of the turbine assembly 30 and the base portion 95 of the second turbine portion 90 is closer to the second axial end 54 of the turbine assembly 30.

The first and second turbine portions 80 and 90 may be attached to each other in variety of different manners. For example, the first and second turbine portions 80 and 90 may be glued, press-fit, trapped, welded, fastened, and/or snapped together. According to one embodiment, the first and second turbine portions 80 and 90 may utilize a shaft shoulder and a retaining clip to stay attached to each other.

It is noted that the turbine assembly 30 provides a different configuration from other conventional multi-part turbine assemblies. For example, some conventional multi-part turbine assemblies include top and bottom portions that each include only a portion of each vane. Accordingly, the full vanes are not created until the top and bottom portions have been assembled together, and the conventional turbine assembly includes a split or parting line through the middle each of the vanes. Comparatively, each of the first turbine portion 80 and the second turbine portion 90 include entire and full first and second vanes 82 and 92, respectively, prior to assembly of the first turbine portion 80 and the second turbine portion 90 together. In particular, before the first turbine portion 80 and the second turbine portion 90 are attached together, the first vanes 82 are each full vanes, and the second vanes 92 are each full vanes. Additionally, other conventional turbine assemblies include dozens of separate parts (i.e., a separate part for each vane) that are molded individually and then assembled to a carrier hub. Comparatively, the first turbine portion 80, including its respective vanes 32 and the first hub 89, is individually and integrally created as one single unitary component, piece, or part (for example, via casting or molding) that cannot be separated without destruction. Likewise, the second turbine portion 90, including its respective vanes 32 and the second hub 99, is individually and integrally created as one single unitary component, piece, or part (for example, via casting or molding) that cannot be separated without destruction.

Undercut Features

Figure 7:
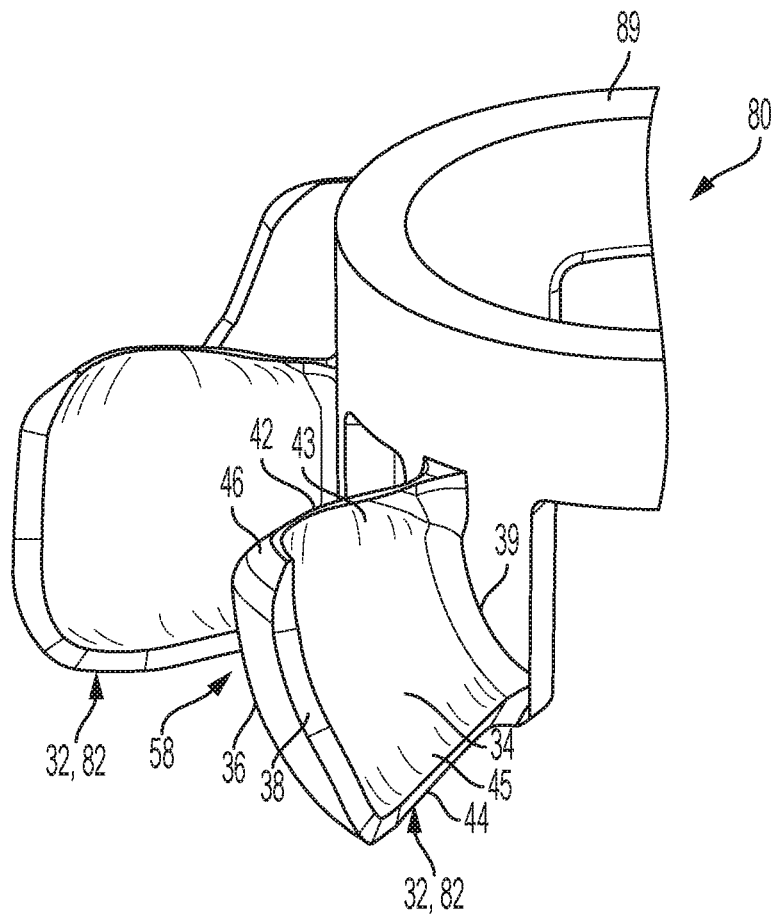
FIG. 7 is a perspective view of the first turbine portion of the turbine assembly of FIG. 3A.

The increased spacing within the channels 58 and distance between each of the first vanes 82 and between each of the second vanes 92 provides sufficient space for adequate tool geometry to create relatively complex vane curvature and allows the first and second vanes 82 and 92 to be more easily manufactured. In particular, the vanes 32 can each be tooled to include "reverse draft" or undercut geometry features. Accordingly, the first and second vanes 82 and 92 may each comprise at least one undercut features (i.e., a top undercut feature 43 and/or a bottom undercut feature 45) (as shown in FIG. 7) that can be pulled by the tool. The top undercut feature 43 extends axially and tangentially along at least a portion of the top end 42 of the vane 32 (and therefore along the first axial end 52 of the turbine assembly 30) and the bottom undercut feature 45 extends axially and tangentially along at least a portion of the bottom end 44 of the vane 32 (and therefore along the second axial end 54 of the turbine assembly 30).

Although the top undercut feature 43 and the bottom undercut feature 45 are shown along the vanes 32, it is understood that the top undercut feature 43 and the bottom undercut feature 45 may be any portion, surface, or feature that diverges from an "axial-parallel" direction (where "axial parallel" is parallel to the center rotational axis 64 of the turbine assembly 30) and extends radially and/or tangentially from, for example, the impingement surface 34 and/or the backside 36 of the vanes 32, from the outer surface of the first hub 89 and/or the second hub 99 between the vanes 32, or from the first axial end 52 or the second axial end 54 of the turbine assembly 30. The top undercut feature 43 and/or the bottom undercut feature 45 may comprise, for example only, a lip, protrusion, extension, wall, curvatures, or flange. Accordingly, the top undercut feature 43 and the bottom undercut feature 45 at least partially block fluid 72 from the jet 70 in the axial direction, which at least partially blocks the fluid 72 from flowing through the first axial end 52 and the second axial end 54, respectively, of the turbine assembly 30. The top undercut feature 43 and the bottom undercut feature 45 are further backward in the rotational direction of the turbine assembly 30 than a middle section of the vane 32 at the same radial distance from the center rotational axis 64.

The top undercut feature 43 is any portion, surface, or structure of the vane 32 that prevents, blocks, or impedes at least a portion of the fluid 72 from axially entering into the turbine assembly 30 (and the channels 58) through the top end 42 of each of the vanes 32. (It is noted that, while the top undercut feature 43 blocks a portion of the fluid 72 from flowing into the channels 58 in the axial direction, the top undercut feature 43 may still allow some of the fluid 72 to flow into the channels 58 as a result of fluid 72 flowing at least partially in the tangential direction and flowing between the top undercut feature 43 of one vane 32 and another vane 32.) As shown in FIGS. 8A-8B, the top undercut feature 43 angles the top end 42 of the vane 32 toward the jet 70 (relative to at least a middle section of the vane 32 that is between the top end 42 and the bottom end 44), which improves jet entry of fluid into the vanes 32 and thus improves turbine efficiency.

In order to create the top undercut feature 43, the top portion of each of the vanes 32 (i.e., the portion closest to the top end 42) is curved relative to the center rotational axis 64 along the length of the vanes 32. More specifically, the top end 42 of each of the vanes 32 (along the top undercut feature 43) is angled forward and tilted toward the jet 70 to better capture and contain the fluid 72 from the jet 70 into each of the vanes 32. Accordingly, the top undercut feature 43 of each of the vanes 32 is not parallel to the center rotational axis 64 and is less than 90° relatively to a horizontal radial-tangential plane. The bottom undercut feature 45 may be formed in a similar manner and with a similar configuration as the top undercut feature 43.

Due to the top undercut feature 43 and the bottom undercut feature 45, each of the vanes 32 is curved along their height (i.e., along the center rotational axis 64). In particular, when the turbine assembly 30 is assembled, the top end 42 and the bottom end 44 of each of the vanes 32 extend toward a backside 36 of another vane 32 (that is positioned directly in front of the vane 32 and that the impingement surface 34 of the vane 32 faces), while a middle portion of each of the vanes 32 (i.e., the portion between the top end 42 and the bottom end 44) extends away from the backside 36 of the other vane 32.

Chamfered Top End and Backside of the Vane

A number of conventional turbine assemblies typically have a "sharp edge" to cleanly cut through the fluid from the jet. However, with the molded or cast single-part design of the present turbine assembly 30, creating a sharp or thin edge along the top end of the vane 32 is difficult since sharp edges are difficult to fill in the molding or casting process. Furthermore, in some conventional turbine assemblies, the top end of the vane may have a flat top, which may cause the fluid to horizontally deflect across the top of the conventional turbine assembly.

Accordingly, in order to minimize the horizontal deflection of the fluid 72 at the entrance into the turbine assembly 30 (as a result of the fluid 72 hitting the top end 42 of each of the vanes 32), each of the vanes 32 comprises a beveled edge or chamfer 46 between and along the backside 36 and the top end 42 of each of the vanes 32 (i.e., the back top corner of each of the vanes 32 is chamfered), as shown in FIG. 7.

The size of the chamfer 46 may vary according to the desired configuration. For example, the size of the chamfer 46 may be 20-80% of the thickness of the vane 32. More preferably, the size of the chamfer 46 may be greater than 50% of the thickness of the vane 32. The chamfer 46 may extend linearly or may be curved between the top end 42 and the backside 36 of each of the vanes 32.

Alternatively, the top end 42 of each of the vanes 32 has a fillet radius in which the corner of the top end 42 along the backside 36 of the vanes 32 is curved, arced, or rounded. In each of above embodiments, the corner of the top end 42 along the impingement surface 34 may still be relatively "sharp" (i.e., at a 90° angle).

Threaded Feature

According to another embodiment as shown in FIGS. 9A-10B, one of the first and second turbine portions 80 and 90 may include threaded features 98 that keep the first and second turbine portions 80 and 90 attached to each other. For example, the second hub 99 of the second turbine portion 90 may comprise an extension 97 that is positioned within and extends through and beyond the first hub 89 of the first turbine portion 80 once the turbine assembly 30 is assembled (i.e., when the first turbine portion 80 and the second turbine portion 90 are attached together). The threaded feature 98 may be positioned along at least a portion of the outer surface of the extension 97 and closer to the first axial end 52 of the turbine assembly 30 (while the second vanes 92 are positioned closer to the second axial end 54 of the turbine assembly 30).

Figure 9A:
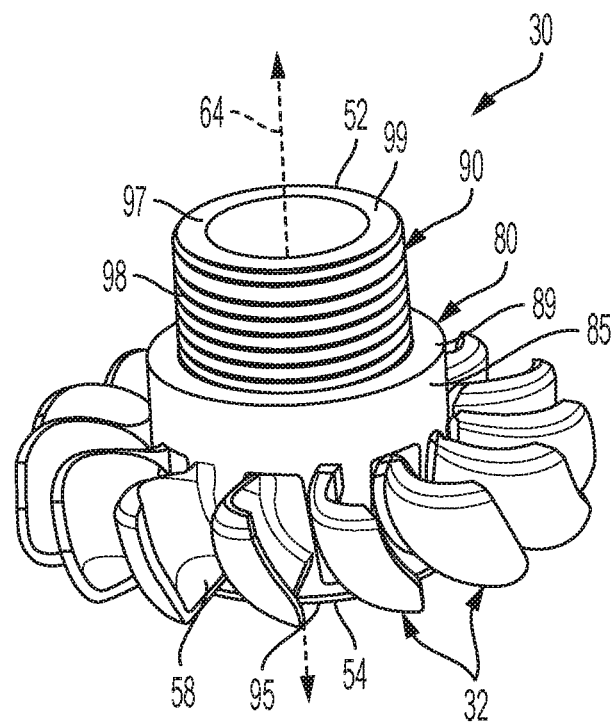
FIG. 9A is a perspective view of a turbine assembly according to another embodiment.
Figure 9B:
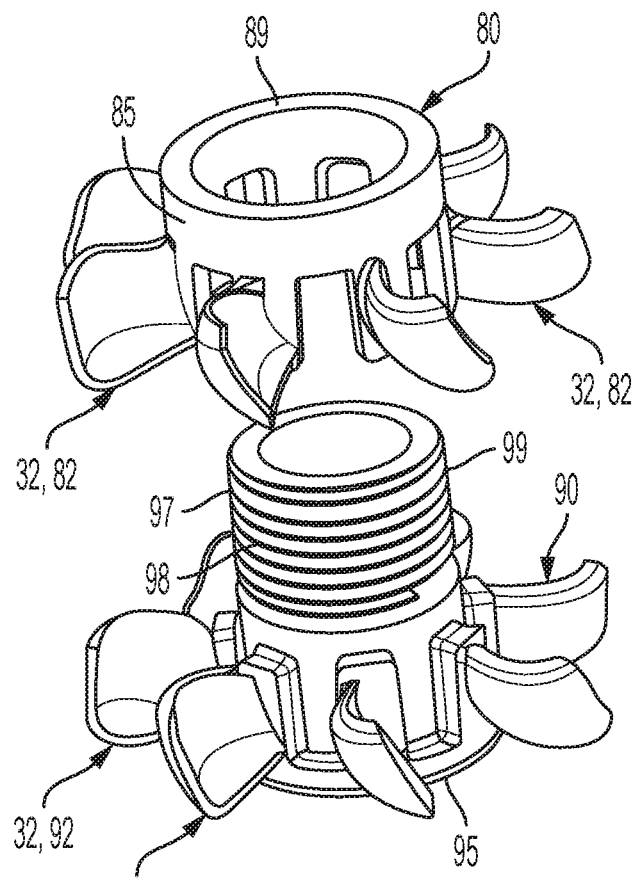
FIG. 9B is an exploded view of the turbine assembly of FIG. 9A.

With the extension 97, the second hub 99 is moved into and partially through the inside of the first hub 89 during assembly. In particular, the threaded feature 98 on the extension 97 is moved through the first hub 89 during assembly. Accordingly, a portion of the second hub 99 extends axially beyond both ends of the first hub 89. More specifically, as shown in FIG. 9A, the threaded feature 98 and the base portion 95 extend at least partially out from opposite ends of the first hub 89 along the center rotational axis 64, such that the second hub 99 thereby defines both the first axial end 52 and the second axial end 54 of the turbine assembly 30. The first turbine portion 80 is positioned axially between the opposite axial ends (in particular between the extension 97 and the base portion 95) of the second turbine portion 90. According to another embodiment without the extension 97 (as shown in FIG. 3A), the base portion 85 along the end of the first hub 89 of the first turbine portion 80 defines the first axial end 52, and the base portion 95 along the end of the second hub 99 of the second turbine portion 90 defines the second axial end 54 of the turbine assembly 30.

Figure 10A:
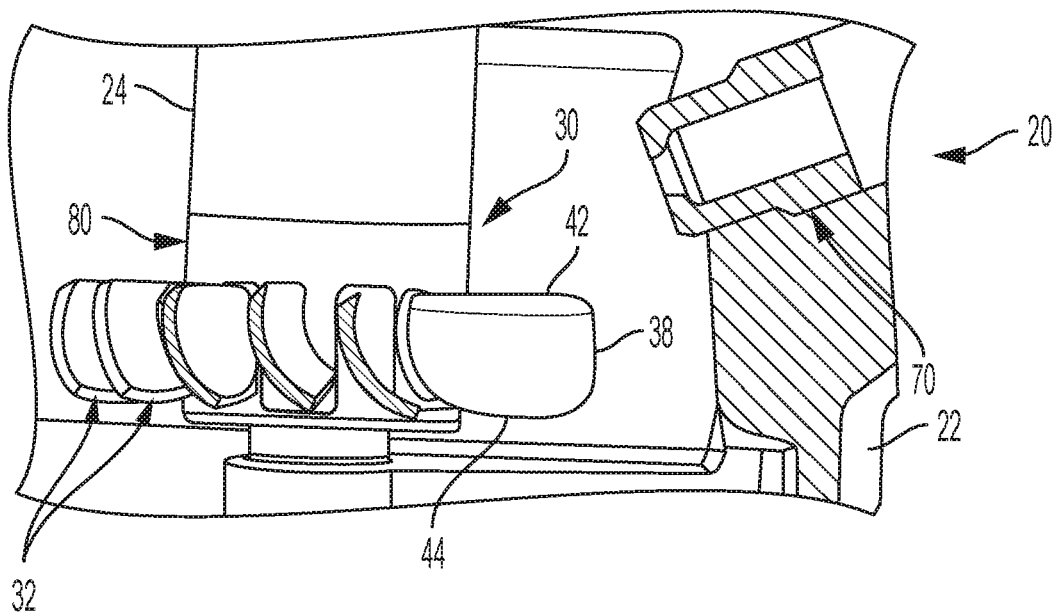
FIG. 10A is a cross-sectional view of a portion of a separation assembly with the turbine assembly of FIG. 9A.
Figure 10B:
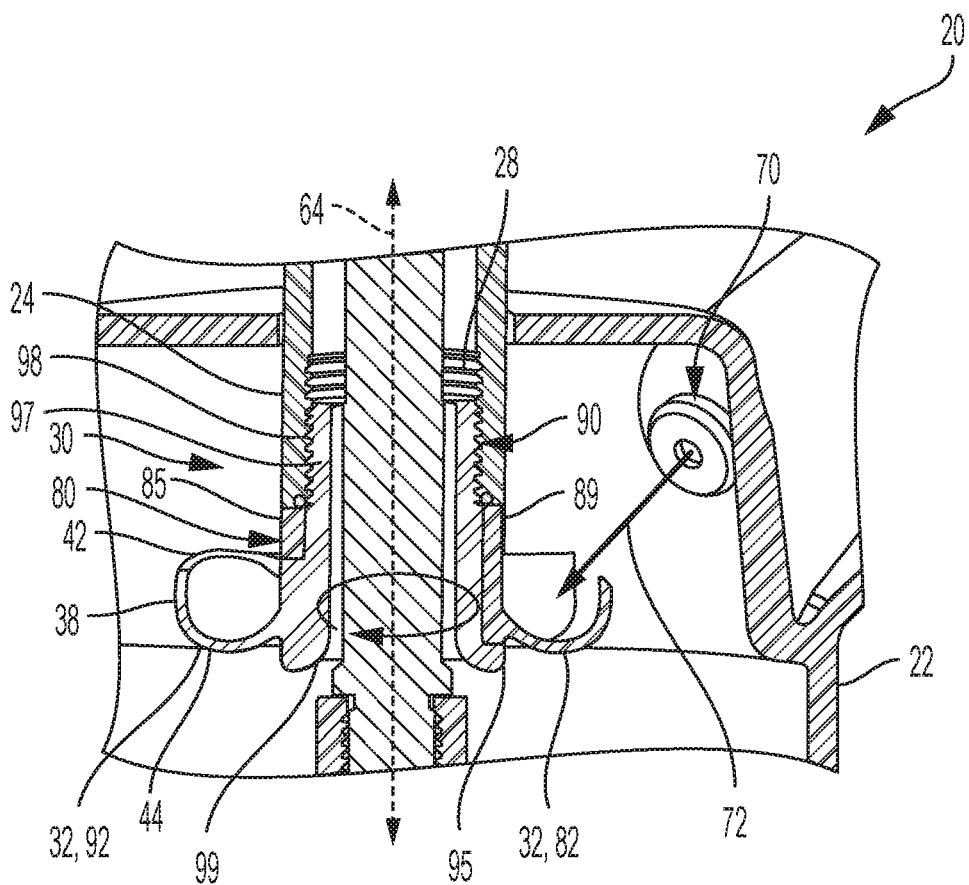
FIG. 10B is a cross-sectional view of a portion of the separation assembly of FIG. 10A.

Once the first turbine portion 80 is moved over and along the second hub 99 of the second turbine portion 90, the threaded feature 98, which is extending out from the first hub 89, is attachable to (e.g., spinable onto) a separate part, such as another portion of the separation assembly 20 (in particular a portion of the filter element). Specifically, the threaded feature 98 is configured to be threadably attached to a corresponding and complementary threaded feature 28 within (e.g., along the inner surface of) the rotor portion 24, as shown in FIG. 10B. Accordingly, the extension 97 of the second hub 99 extends into the rotor portion 24, and the threaded feature 98 of the extension 97 attaches to the threaded feature 28 of the rotor portion 24.

Once the threaded features 28 and 98 are attached to each other, the first turbine portion 80 is positioned axially between the base portion 95 of the second turbine portion 90 and a bottom surface of the rotor portion 24 (beneath the threaded feature 28 of the rotor portion 24), as shown in FIG. 10B. This configuration traps and secures the first turbine portion 80 in place on the second turbine portion 90 and eliminates the need for any additional manufacturing process to secure the first and second turbine portions 80 and 90 together prior to assembly of the separation assembly 20.

Each of the threaded features 28 and 98 are oriented such that the turbine assembly 30 threads onto the rotor portion 24 in the direction of rotation of the turbine assembly 30 (due to the jet 70), which allows the force from the jet 70 to help the turbine assembly 30 stay securely attached to the rotor portion 24. Accordingly, the turbine assembly 30 is continually tightened (in the rotational direction) onto the rotor portion 24 as the jet 70 rotates the turbine assembly 30 and the turbine assembly 30 in turn rotates the rotor portion 24 congruently.

As utilized herein, the terms "approximately," "substantially," and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A separation assembly comprising:
    a housing;
    a jet that expels a fluid within the housing; and
    a turbine assembly positioned within the housing and positioned so as to be contacted by the fluid expelled from the jet, the fluid causing the turbine assembly to rotate about a center rotational axis within the housing,
    the turbine assembly comprising a first turbine portion and a second turbine portion that are separately formed from each other and attachable together, the first turbine portion comprising a plurality of first vanes, a plurality of first ribs defining a plurality of first recesses, and a plurality of first inner walls, and the second turbine portion comprising a plurality of second vanes, a plurality of second ribs defining a plurality of second recesses, and a plurality of second inner walls;
    the plurality of first vanes and the plurality of second vanes defining axially-extending channels that each extend radially between one of the plurality of first vanes and one of the plurality of second vanes when the turbine assembly is assembled,
    the plurality of first inner walls are each positioned between two of the plurality of first ribs; and
    the plurality of second inner walls are each positioned between two of the plurality of second ribs.

2. The separation assembly of claim 1, wherein at least a portion of each of the first vanes extends along and from a respective one of the first ribs and at least a portion of each of the second vanes extends along and from a respective one of the second ribs.

3. The separation assembly of claim 2, wherein the plurality of first vanes and the plurality of second vanes each extend radially between an inner side edge and an outer side edge, where the entire inner side edge of each of the plurality of first vanes extends along and from the respective one of the plurality of first ribs and the entire inner side edge of each of the plurality of second vanes extends along and from the respective one of the plurality of second ribs.

4. The separation assembly of claim 2, wherein the plurality of first ribs and the plurality of second ribs are complementary to each other such that the plurality of first ribs and the plurality of second ribs circumferentially and axially align the first turbine portion and the second turbine portion.

5. The separation assembly of claim 1, wherein, when the first turbine portion and the second turbine portion are attached together, the plurality of first vanes and the plurality of second vanes are alternatively arranged with each other about a circumference of the turbine assembly.

6. The separation assembly of claim 1, wherein the plurality of first vanes of the first turbine portion is exactly half of the total number of vanes within the turbine assembly, and the plurality of second vanes of the second turbine portion is exactly the other half of the total number of vanes within the turbine assembly.

7. The separation assembly of claim 1, wherein the distance between individual vanes of the plurality of first vanes is greater than the distance between each of the plurality of first vanes and the plurality of second vanes once the first turbine portion and the second turbine portion are attached together.

8. The separation assembly of claim 1, wherein, once the first turbine portion and the second turbine portion are attached to each other, the plurality of first vanes and the plurality of second vanes are all circumferentially and axially aligned with each other.

9. The separation assembly of claim 1, wherein the plurality of first vanes are each full vanes and the plurality of second vanes are each full vanes before the first turbine portion and the second turbine portion are attached together.

10. The separation assembly of claim 1, wherein each of the plurality of first vanes and each of the plurality of second vanes extends axially between and curve relative to an axial direction between a top end and a bottom end, wherein the axial direction is parallel to the center rotational axis, and
    wherein each of the plurality of vanes curve relative to a radial direction between a radially inner side edge and a radial outer side edge of the plurality of vanes.

11. The separation assembly of claim 1, wherein the plurality of first vanes and the plurality of second vanes each comprise an undercut feature that partially blocks fluid from the jet in an axial direction.

12. The separation assembly of claim 11, wherein the undercut feature is a top undercut feature that extends along at least a portion of a respective top end of each of the plurality of the first vanes and each of the plurality of the second vanes, wherein the jet is positioned such that at least a portion of the fluid enters into the turbine assembly along the respective top ends of the plurality of first vanes and the plurality of second vanes.

13. The separation assembly of claim 1, wherein the first turbine portion comprises a first center hub that the first plurality of vanes extends from and the second turbine portion comprises a second center hub that the second plurality of vanes extends from.

14. The separation assembly of claim 13,
    wherein the plurality of first ribs and the plurality of first recesses of the first hub are complementary to the plurality of second ribs and the plurality of second recesses of the second hub such that each of the plurality of first ribs fits securely within a respective one of the plurality of second recesses and between two of the plurality of second ribs.

15. The separation assembly of claim 14, wherein the plurality of first inner walls and the plurality of second inner walls are recessed relative to an outermost radial surface of the plurality of first ribs and the plurality of second ribs, respectively.

16. The separation assembly of claim 15, wherein inner surfaces of the plurality of first ribs and the plurality of second ribs are complementary to outer surfaces of the plurality of second inner walls and the plurality of first inner walls, respectively.

17. The separation assembly of claim 13, wherein the second hub comprises an extension that extends through and beyond the first hub when the first turbine portion and the second turbine portion are attached together such that the first turbine portion is positioned axially between opposite axial ends of the second turbine portion.

18. The separation assembly of claim 17, wherein the second turbine portion comprises a threaded feature positioned along at least a portion of an outer surface of the extension and configured to threadably attach to a rotor portion of the separation assembly.

19. The separation assembly of claim 1, wherein the first turbine portion and the second turbine portion are each individually and integrally created as a single, unitary part.

20. The separation assembly of claim 1, wherein the jet is positioned at an angle relative to a horizontal radial-tangential plane of the turbine assembly, and wherein the horizontal radial-tangential plane of the turbine assembly is perpendicular to the center rotational axis.

21. The separation assembly of claim 1, wherein each of the plurality of first vanes and each of the plurality of second vanes extends axially between a top end and a bottom end and comprise an impingement surface on a first side thereof, a backside on a second side thereof, and a chamfer between the backside and the top end, and
wherein the jet is positioned such that at least a portion of the fluid enters into the turbine assembly along the respective top ends of the plurality of first vanes and the plurality of second vanes and the fluid from the jet is directed directly to the impingement surface.

22. A turbine assembly for use in a separation assembly, the turbine assembly sized for positioning within a housing of the separation assembly and positionable so as to be contacted by fluid expelled from a jet of the separation assembly, thereby causing the turbine assembly to rotate about a center rotational axis within the housing, the turbine assembly comprising:
a first turbine portion comprising a plurality of first vanes, a plurality of first ribs defining a plurality of first recesses, and a plurality of first inner walls; and
a second turbine portion comprising a plurality of second vanes, a plurality of second ribs defining a plurality of second recesses, and a plurality of second inner walls,
the first turbine portion and the second turbine portion being separately formed from each other and attachable together,
the plurality of first vanes and the plurality of second vanes defining axially-extending channels that each extend radially between one of the plurality of first vanes and one of the plurality of second vanes when the turbine assembly is assembled,
the plurality of first inner walls are each positioned between two of the plurality of first ribs; and
the plurality of second inner walls are each positioned between two of the plurality of second ribs.

23. The turbine assembly of claim 22, wherein at least a portion of each of the first vanes extends along and from a respective one of the first ribs and at least a portion of each of the second vanes extends along and from a respective one of the second ribs.

24. A method of assembling a separation assembly, the separation assembly comprising a housing, a jet that expels a fluid within the housing, and a turbine assembly that comprises a first turbine portion and a second turbine portion, the method comprising:
separately forming the first turbine portion and the second turbine portion of the turbine assembly, the first turbine portion comprising a plurality of first vanes, a plurality of first ribs defining a plurality of first recesses, and a plurality of first inner walls, and the second turbine portion comprising a plurality of second vanes, a plurality of second ribs defining a plurality of second recesses, and a plurality of second inner walls;
attaching the first turbine portion and the second turbine portion together to form the turbine assembly,
the plurality of first vanes and the plurality of second vanes defining axially-extending channels that each extend radially between one of the plurality of first vanes and one of the plurality of second vanes when the turbine assembly is assembled; and
positioning the turbine assembly within the housing so as to be contacted by the fluid expelled from the jet, the fluid causing the turbine assembly to rotate about a center rotational axis within the housing;
the plurality of first inner walls are each positioned between two of the plurality of first ribs; and
the plurality of second inner walls are each positioned between two of the plurality of second ribs.

25. The method of claim 24, wherein the first turbine portion and the second turbine portion are each individually and integrally created as a single, unitary part.

26. A separation assembly comprising:
a housing;
a jet that expels a fluid within the housing; and
a turbine assembly positioned within the housing and positioned so as to be contacted by the fluid expelled from the jet, the fluid causing the turbine assembly to rotate about a center rotational axis within the housing,
the turbine assembly comprising a first turbine portion and a second turbine portion that are separately formed from each other and attachable together, the first turbine portion comprising a plurality of first vanes, a plurality of first ribs defining a plurality of first recesses, and a plurality of first inner walls, and the second turbine portion comprising a plurality of second vanes, a plurality of second ribs defining a plurality of second recesses, and a plurality of second inner walls,
wherein the plurality of first vanes and the plurality of second vanes each comprise an undercut feature that partially blocks fluid from the jet in an axial direction;
the plurality of first inner walls are each positioned between two of the plurality of first ribs; and
the plurality of second inner walls are each positioned between two of the plurality of second ribs.

27. The separation assembly of claim 26, wherein the undercut feature is a top undercut feature that extends along at least a portion of a respective top end of each of the plurality of the first vanes and each of the plurality of the second vanes, wherein the jet is positioned such that at least a portion of the fluid enters into the turbine assembly along the respective top ends of the plurality of first vanes and the plurality of second vanes.

28. A separation assembly comprising:
a housing;

a jet that expels a fluid within the housing; and
a turbine assembly positioned within the housing and positioned so as to be contacted by the fluid expelled from the jet, the fluid causing the turbine assembly to rotate about a center rotational axis within the housing,
the turbine assembly comprising a first turbine portion and a second turbine portion that are separately formed from each other and attachable together, the first turbine portion comprising a plurality of first vanes and the second turbine portion comprising a plurality of second vanes,
wherein the first turbine portion comprises a first center hub that the first plurality of vanes extends from and the second turbine portion comprises a second center hub that the second plurality of vanes extends from,
wherein the first center hub comprises a plurality of first ribs and defines a plurality of first recesses and the second hub comprises a plurality of second ribs and a plurality of second recesses,
wherein the plurality of first ribs and the plurality of first recesses of the first hub are complementary to the plurality of second ribs and the plurality of second recesses of the second hub such that each of the plurality of first ribs fits securely within a respective one of the plurality of second recesses and between two of the plurality of second ribs,
wherein the first turbine portion comprises a plurality of first inner walls that are each positioned between two of the plurality of first ribs and the second turbine portion comprises a plurality of second inner walls that are each positioned between two of the plurality of second ribs, and
wherein the plurality of first inner walls and the plurality of second inner walls are recessed relative to an outermost radial surface of the plurality of first ribs and the plurality of second ribs, respectively.

29. The separation assembly of claim 28, wherein inner surfaces of the plurality of first ribs and the plurality of second ribs are complementary to outer surfaces of the plurality of second inner walls and the plurality of first inner walls, respectively.

30. A separation assembly comprising:
a housing;
a jet that expels a fluid within the housing; and
a turbine assembly positioned within the housing and positioned so as to be contacted by the fluid expelled from the jet, the fluid causing the turbine assembly to rotate about a center rotational axis within the housing,
the turbine assembly comprising a first turbine portion and a second turbine portion that are separately formed from each other and attachable together, the first turbine portion comprising a plurality of first vanes, a plurality of first ribs defining a plurality of first recesses, and a plurality of first inner walls, and the second turbine portion comprising a plurality of second vanes, a plurality of second ribs defining a plurality of second recesses, and a plurality of second inner walls,
wherein the first turbine portion comprises a first center hub that the first plurality of vanes extends from and the second turbine portion comprises a second center hub that the second plurality of vanes extends from,
wherein the second hub comprises an extension that extends through and beyond the first hub when the first turbine portion and the second turbine portion are attached together such that the first turbine portion is positioned axially between opposite axial ends of the second turbine portion,
the plurality of first inner walls are each positioned between two of the plurality of first ribs, and
the plurality of second inner walls are each positioned between two of the plurality of second ribs.

31. The separation assembly of claim 30, wherein the second turbine portion comprises a threaded feature positioned along at least a portion of an outer surface of the extension and configured to threadably attach to a rotor portion of the separation assembly.

32. A separation assembly comprising:
a housing;
a jet that expels a fluid within the housing; and
a turbine assembly positioned within the housing and positioned so as to be contacted by the fluid expelled from the jet, the fluid causing the turbine assembly to rotate about a center rotational axis within the housing,
the turbine assembly comprising a first turbine portion and a second turbine portion that are separately formed from each other and attachable together, the first turbine portion comprising a plurality of first vanes, a plurality of first ribs defining a plurality of first recesses, and a plurality of first inner walls, and the second turbine portion comprising a plurality of second vanes, a plurality of second ribs defining a plurality of second recesses, and a plurality of second inner walls,
wherein each of the plurality of first vanes and each of the plurality of second vanes extends axially between a top end and a bottom end and comprise an impingement surface on a first side thereof, a backside on a second side thereof, and a chamfer between the backside and the top end, and
wherein the jet is positioned such that at least a portion of the fluid enters into the turbine assembly along the respective top ends of the plurality of first vanes and the plurality of second vanes and the fluid from the jet is directed directly to the impingement surface;
the plurality of first inner walls are each positioned between two of the plurality of first ribs; and
the plurality of second inner walls are each positioned between two of the plurality of second ribs.

* * * * *